(12) United States Patent
Innanen et al.

(10) Patent No.: US 9,390,688 B2
(45) Date of Patent: Jul. 12, 2016

(54) RE-CONFIGURING THE STANDBY SCREEN OF AN ELECTRONIC DEVICE

(71) Applicant: Nokia Corporation, Espoo (FI)

(72) Inventors: Piia Innanen, Oulu (FI); Tita Kangas, Kaarina (FI); Mikko With, Tupos (FI); Andrew Fowlie, Kauniainen (FI); Laura Junkkonen, Oulunsalo (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 13/918,084

(22) Filed: Jun. 14, 2013

(65) Prior Publication Data

US 2013/0278637 A1    Oct. 24, 2013

Related U.S. Application Data

(63) Continuation of application No. 11/449,448, filed on Jun. 7, 2006, and a continuation of application No. PCT/IB2005/002097, filed on Jun. 10, 2005.

(51) Int. Cl.
*G09G 5/00* (2006.01)
*G09G 5/373* (2006.01)
*H04M 1/725* (2006.01)

(52) U.S. Cl.
CPC ............ *G09G 5/373* (2013.01); *H04M 1/72544* (2013.01); *H04M 1/7258* (2013.01)

(58) Field of Classification Search
CPC .......... G09G 5/373; G09G 5/00; G09G 5/14; G06F 3/048; G06F 3/0482; G06F 3/041; G06F 3/0416; G06F 3/0412; G06F 3/01; G06F 3/017; G06F 3/0488; G06F 3/0481; G06F 3/04817; G06F 3/0486; G06F 2203/04806; H04M 1/7258; H04M 1/72544

USPC ........... 345/156, 169; 715/700, 788, 825, 867
See application file for complete search history.

(56) References Cited

U.S. PATENT DOCUMENTS

| | | | |
|---|---|---|---|
| 5,473,320 A | 12/1995 | DeLuca et al. | 340/825.44 |
| 5,708,786 A | 1/1998 | Teruuchi | |
| 5,838,317 A * | 11/1998 | Bolnick | G06F 3/0481 707/999.007 |
| 5,907,327 A | 5/1999 | Ogura et al. | 715/764 |
| 6,014,135 A | 1/2000 | Fernandes | |
| 6,061,695 A | 5/2000 | Slivka et al. | 715/203 |
| 6,353,449 B1 | 3/2002 | Gregg et al. | |
| 6,499,113 B1 * | 12/2002 | Tobin | G06F 11/0721 714/19 |
| 6,552,746 B1 | 4/2003 | Yang et al. | 348/308 |

(Continued)

FOREIGN PATENT DOCUMENTS

| | | |
|---|---|---|
| EP | 1 152 583 A1 | 11/2001 |
| EP | 1 130 886 A2 | 10/2003 |

(Continued)

OTHER PUBLICATIONS www.msmobiles.com/news/php/3259.html(3 pages).

(Continued)

*Primary Examiner* — Jason Olson
*Assistant Examiner* — Sosina Abebe
(74) *Attorney, Agent, or Firm* — Harrington & Smith (57) ABSTRACT

An electronic device comprising: a user interface having a display for displaying a standby screen when the device is in an idle state and a user input device, wherein the user interface provides a menu system, for re-configuring the standby screen, that is navigated using the user input device.

20 Claims, 6 Drawing Sheets

(56) References Cited

U.S. PATENT DOCUMENTS

| | | | |
|---|---|---|---|
| 6,781,575 B1* | 8/2004 | Hawkins et al. | 345/173 |
| 7,158,169 B1 | 1/2007 | Farber et al. | 348/173 |
| 7,263,670 B2 | 8/2007 | Rekimoto | 715/837 |
| 7,366,547 B2 | 4/2008 | Hasegawa et al. | 455/566 |
| 7,441,034 B2 | 10/2008 | Tsurusaki et al. | 709/227 |
| 2002/0065110 A1* | 5/2002 | Enns | G06F 17/30905 455/566 |
| 2002/0135621 A1* | 9/2002 | Angiulo et al. | 345/838 |
| 2002/0171881 A1 | 11/2002 | Merrill et al. | 358/513 |
| 2003/0206197 A1 | 11/2003 | McInerney | 345/764 |
| 2004/0014485 A1 | 1/2004 | Sugauchi et al. | 455/550.1 |
| 2004/0085468 A1 | 5/2004 | Knee et al. | 348/308 |
| 2004/0100479 A1* | 5/2004 | Nakano et al. | 345/700 |
| 2004/0153624 A1 | 8/2004 | Zhou et al. | 712/4 |
| 2004/0178465 A1 | 9/2004 | Merrill et al. | 257/440 |
| 2004/0210554 A1 | 10/2004 | Oliver et al. | |
| 2004/0230843 A1 | 11/2004 | Jansen | 713/202 |
| 2004/0250217 A1* | 12/2004 | Tojo et al. | 715/810 |
| 2005/0026644 A1 | 2/2005 | Lien | 455/550.1 |
| 2005/0026657 A1 | 2/2005 | Hasegawa et al. | 455/566 |
| 2005/0071771 A1* | 3/2005 | Nagasawa et al. | 715/765 |
| 2005/0091272 A1 | 4/2005 | Smith et al. | |
| 2006/0012832 A1 | 1/2006 | Kayanuma | 358/296 |
| 2006/0015818 A1* | 1/2006 | Chaudhri et al. | 715/779 |
| 2006/0033114 A1 | 2/2006 | Schanz | 257/88 |
| 2006/0107231 A1* | 5/2006 | Matthews et al. | 715/788 |

FOREIGN PATENT DOCUMENTS

| | | |
|---|---|---|
| EP | 1574024 | 9/2005 |
| EP | 1738592 | 1/2007 |
| EP | 1745662 | 1/2007 |
| EP | 1779638 | 5/2007 |
| EP | 1864390 | 12/2007 |
| EP | 1880477 | 1/2008 |
| KR | 2001-89639 | 10/2001 |
| KR | 200308396 A | 11/2003 |
| KR | 2003095607 A | 12/2003 |
| KR | 20050014929 A | 2/2005 |
| KR | 2005-26729 | 3/2005 |
| WO | WO-2004/057847 A1 | 7/2004 |
| WO | WO-2005/104572 A1 | 11/2005 |
| WO | WO-2005/112491 A1 | 11/2005 |
| WO | WO-2006/016227 A2 | 2/2006 |
| WO | WO-2006/104307 A1 | 10/2006 |
| WO | WO-2006/121238 A1 | 11/2006 |

OTHER PUBLICATIONS www.smartphone.net/software_detail.asp?id=870 (6 pages).
www.mobile.msmobiles.com/article.php?id=43 (2 pages).
www.mobilejoe.de/joeforums/archive/index.php?t-10842.html (3 pages).
www.msdn.microsoft.com/library/en-us/dnppcgen/html/sp02homescreen.asp?frame=t . . . (24 pages).

* cited by examiner

RE-CONFIGURING THE STANDBY SCREEN OF AN ELECTRONIC DEVICE

FIELD OF THE INVENTION

Embodiments of the present invention relate to re-configuring the standby screen of an electronic device.

BACKGROUND TO THE INVENTION

Electronic devices with displays such as mobile cellular telephones, personal digital assistants and gaming devices typically have a standby screen. This screen is displayed when the device is switched on i.e. when the device is 'active' and while the device is not used for a specific application i.e. while the device is idle. When an application that is being used on the device is exited, the display returns 'home' and displays the active standby screen until the application or a different application is started. If the device has a menu system organized as a hierarchical tree, then the standby screen is at the root of the hierarchical tree.

As the standby screen may be displayed on the device frequently, it would be desirable to allow a user to customize the information presented in the standby screen.

At present, the user may be able to select a background for the standby screen. The user may also be able to select graphical information or control items for display in the foreground of the display over the background. A graphical information item is an item that presents information to a user of the device such as a clock. The user can check the information provided by a graphical information item by simply looking at the standby screen. A graphical control item is a selectable item that allows a user to control the device and may be, for example, a 'shortcut' to an application.

Currently, for mobile cellular telephones, different platforms offer a number of standard standby screens or different screen layout patterns for the user. A user can view the pre-defined standby screens and select the one that he/she likes but it is not possible to simply edit a chosen standard layout. Typically customizing the standby screen requires knowledge about the format of standby screen layout files and a text editor for a high-end cellular radio telephone (a smart phone) to be able to alter a standby screen by manually editing the standby screen layout file. However, this process requires the user to have some expertise in programming and may also require the downloading of a text editor to the smart phone.

BRIEF DESCRIPTION OF THE INVENTION

It would be desirable to allow a user of an electronic device to simply re-configure, using the device, the standby screen of the device, particularly the layout, without selecting one of a predetermined plurality of standby screen layouts or having to write new code for a standby screen layout.

According to one embodiment of the invention there is provided an electronic device comprising: a user interface having a display for displaying a standby screen when the device is in an idle state and a user input device, wherein the user interface provides a menu system, for re-configuring the standby screen, that is navigated using the user input device.

An advantage of this and other embodiments of the invention is that it further improves the ease and convenience with which the standby screen can be personalized as no programming is required. A user can freely define where he/she wants to see certain pieces of information. This is particularly important when the user has a special wallpaper image and wants to see certain parts of it but still utilize the rest of the standby screen e.g. for showing calendar information or for shortcut icons.

The standby screen comprises a plurality of zones and the menu system provides for the movement and re-sizing of the zones, for example, one zone at a time.

The standby screen may comprise a plurality of items and the menu system may comprise an option for modifying an attribute of a selected item. The menu system may comprise an option for selecting one of the plurality of items from a list of the plurality of items. The attribute for modification may be selected from a list of possible attributes in the menu. Modifying an attribute may modify the value associated with the attribute, the value being selected from a predetermined list of possible attribute values in the menu. The attribute may be size and/or location of the selected item in the standby screen.

The menu system may comprise an option for deleting a selected one of the plurality of items and/or comprise an option for adding an item to the plurality of items.

According to another embodiment of the invention there is provided a method for re-configuring the standby screen of an electronic device comprising:
providing a menu system, for re-configuring the standby screen, that is navigated using a user input device; and displaying the standby screen when the device is in an idle state.

According to another embodiment of the invention there is provided a computer program for re-configuring the standby screen of an electronic device comprising: computer program instructions that provide a menu system, for re-configuring the standby screen, that is navigable using a user input device.

According to another embodiment of the invention there is provided an electronic device comprising: a display for displaying a standby screen; a memory for storing data defining the standby screen; a user input device; and a processor for using the stored data to control the content of the standby screen on the display and for automatically modifying the stored data in a predetermined way, to re-configure the standby screen, in response to a predetermined user input via the user input device.

The automatic modification of the stored data may modify the layout of the standby screen. The stored data may be modifiable in a plurality of predetermined ways each of said ways being associated with a different option selectable by the user from a menu using the user input device.

The standby screen may comprise a plurality of items and the processor may provide a hierarchical menu system comprising an option for modifying an attribute of a selected item defined by the stored data. The menu system may comprise an option for selecting one of the plurality of items from a list of the plurality of items. The attribute for modification may be selected from a list of possible attributes in the menu. Modifying an attribute may modify the value associated with the attribute, the value being selected from a predetermined list of possible attribute values in the menu. The attribute may be size and/or location of the selected item in the standby screen.

According to another embodiment of the invention there is provided a method for re-configuring a standby screen of an electronic device comprising:
storing data defining the standby screen; automatically modifying the stored data in a predetermined way, to re-configure the standby screen, in response to a predetermined user input via a user input device; and displaying the standby screen using the modified stored data.

According to another embodiment of the invention there is provided a computer program for re-configuring a standby screen of an electronic device comprising: computer program instructions for automatically modifying predetermined data in a predetermined way, to re-configure the standby screen, in response to a predetermined user input via a user input device.

BRIEF DESCRIPTION OF THE DRAWINGS

For a better understanding of the present invention reference will now be made by way of example only to the accompanying drawings in which.

DETAILED DESCRIPTION OF EMBODIMENTS OF THE INVENTION

Figure 1:
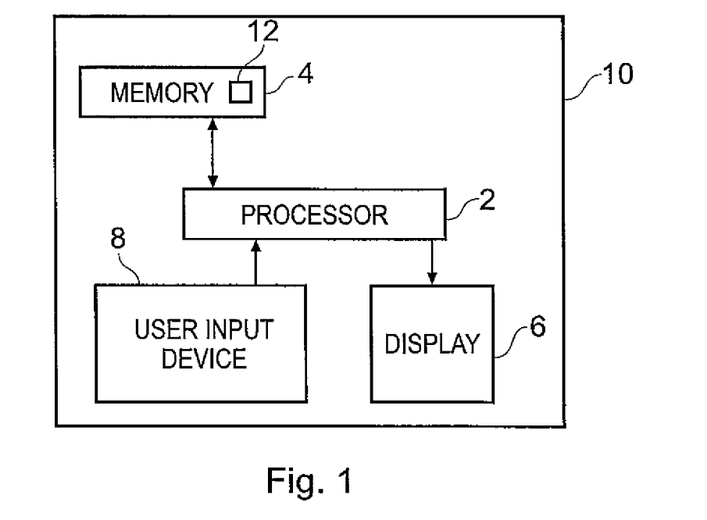
FIG. 1 schematically illustrates an electronic device 10.

FIG. 1 schematically illustrates a hand-portable electronic device 10. It comprises a processor 2, a memory 4, a display 6 and a user input device 8. Only as many components are illustrated as are necessary for the following description of an embodiment of the invention. Other embodiments may have additional and/or different components.

The processor 2 is connected to write to and read from the memory 4, to provide control signals to the display 6 and to receive control signals from the user input device 8. The memory 4 stores a standby screen layout file and also computer program instructions 12, which when loaded into the processor 2 control the operation of the device 10 as described below. The computer program instructions or a part of the computer program instructions may be downloaded from a data storage device either by the manufacturer of the device 10 or by a user of the device 10. The computer program instructions may arrive at the electronic device 10 via an electromagnetic carrier signal or be copied from a physical entity such as a computer program product, a memory device or a record medium such as a CD-ROM or DVD.

The user input device 8 is any suitable device that allows a user to provide input to the device 10. It may be, for example, one or more keys, a joystick, a touch-screen etc.

Figure 3:
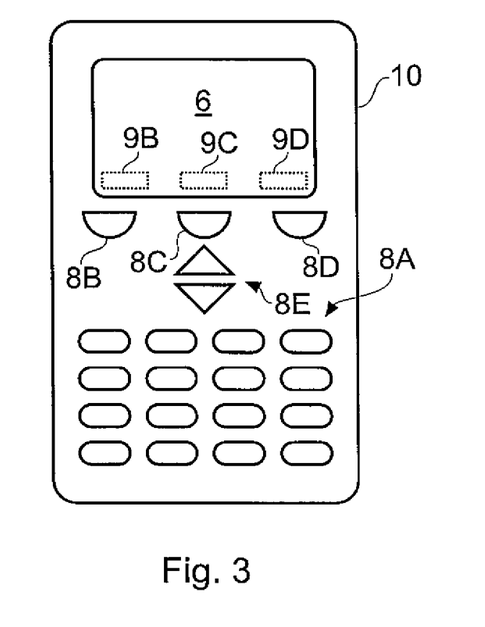
FIG. 3 schematically illustrates one type of hand-portable electronic device 10.

FIG. 3 schematically illustrates one type of hand-portable electronic device 10. In this example, the hand-portable electronic device 10 is a mobile cellular telephone. The user input device 8 comprises an ITU-T keypad 8A, 'soft' keys 8B, 8C and 8D along the lower edge of the display 6 and a selector 8E such as scroll-up/scroll-down keys, a joystick or similar. 'Soft' keys 8B, 8C and 8D have associated legends 9B, 9C and 9D, respectively. The legend associated with a soft key indicates the function of the soft key at that time. The function of the soft key is programmable and a function (and legend) may change as the operational state of the device changes.

The display 6 is used to present content to the user of the device 10. This content may be presented as a series of screens, a particular screen being provided when the device is in a particular operational state. A standby screen is presented when the device 10 is in a standby state. The standby state is entered when the device is switched on, it is the 'root' of the device's hierarchical menu system and it is the state entered when the device is active but idle, i.e. it is not in another state.

The standby screen typically includes a 'background' and graphical items such as icons in the foreground. A graphical item is positioned within its own 'zone' of the standby screen. The background may be a picture, design, wallpaper or similar. A graphical item may be a widget or control item that causes the device to enter a new state, e.g. a short-cut to an application, or an information item that is used to convey information to the user. Some non-limiting examples of information items include clock, power level, alarm clock, number of unread messages, calendar information, user note etc.

The standby screen is typically defined using a standby screen layout file. The standby screen layout file may be an XML file comprising a number of separate elements that are used to specify respective graphical items for display on the standby screen. An element will typically be delineated by 'element' tags and comprise an identifier and a number of sub-elements. A first sub-element may use a first attribute to define the start location, on the horizontal axis, of the graphical item associated with the element and a second attribute to define the start location on the vertical axis of that graphical item. A second sub-element may use a first attribute to define the width of the graphical item associated with the element and a second attribute to define the height of that graphical item. A third sub-element may provide the location of code used to define the content of the graphical item associated with the element.

The series of FIGS. 2A to 2I illustrate the user customization of a standby screen of a device 10 using a menu of the device 10.

The user, through a menu, selects the 'My idle' option. This option allows a user to personalize their 'Idle' i.e. standby screen. The standby screen comprises a series of zones of user controllable size and position. A zone may be associated with a graphical item. The user is able to move the zones around, modify zones, delete zones etc as described below. When the 'My idle' option is selected, a representation of the standby screen is provided in which a zone, associated with a graphical item, is labeled with text identifying the graphical item. The identifier of the element of the standby screen layout file associated with a graphical item may be used as the text labeling that graphical item's zone or, alternatively, the text labeling could be defined by the user.

Figure 2A:
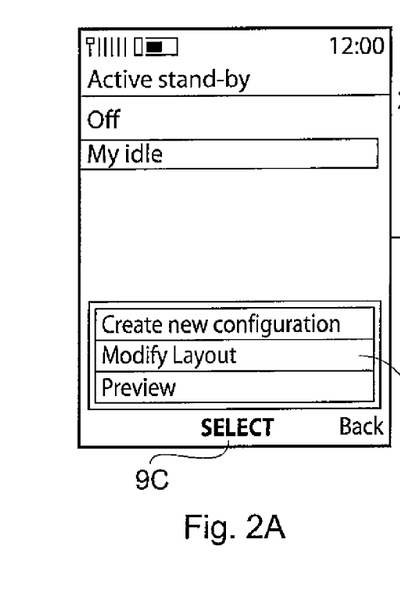
FIGS. 2A to 2I illustrate the user customization of a standby screen of a device 10 using a menu of the device 10.
Figure 2B:
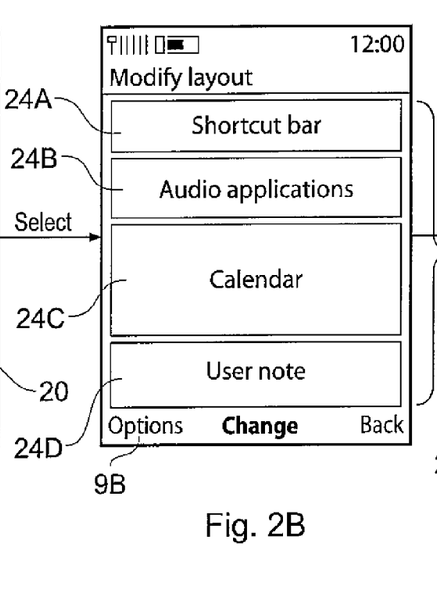

Next, as illustrated in FIG. 2A, a number of alternate options 20 are presented to the user including 'Modify layout' which is selected using the softkey 8C. When the user selects this option by depressing the softkey 8C, a new screen is presented as illustrated in FIG. 2B. In this screen, the content of the standby screen 22 is represented as a number of zones, and a zone that is used in the standby screen has a textual identifier. The standby screen 22 comprises, in this example, four graphical items 24A, 24B, 24C and 24D. In this example, the graphical items 24A-24D are presented as zones extending across the width of the display 6 and stacked one on top of the other up the height of the display 6. The graphical items (zones), in order from the bottom of the display to the top, are 'User note' 24D, 'Calendar' 24C, Audio applications' 24B and 'Shortcut bar' 24A. The uppermost graphical item (zone), the Shortcut bar 24A is highlighted by default. The selector 8E can be used to scroll the highlight up/down to select a desired graphical item (zone) 24A-24D. In this example, the softkey 9B is depressed selecting 'options' while the 'Shortcut bar' graphical item 24A is highlighted.

Figure 2C:
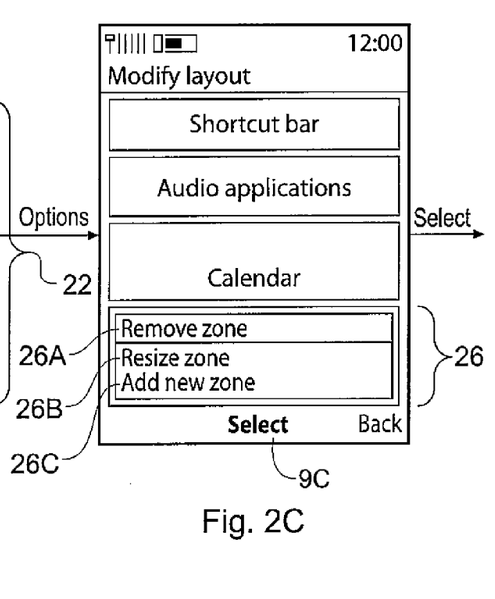

A new screen is presented as illustrated in FIG. 2C. A number of different options 26 are presented including 'Remove zone' 26A, 'Resize zone' 26B and 'add new zone' 26C. Other options may also be presented such as 'move zone'. An appropriate option 26 is selected by highlighting the desired option using selector 9E and then depressing the soft key 9C.

In the illustrated example, the 'Remove zone' option 26A is highlighted by default and is selected. The 'Shortcut bar' graphical item 24A is then automatically removed from the standby screen 22. This is achieved, for example, by deleting or inhibiting the element in the standby screen layout file that relates to the 'Shortcut bar' graphical item 24A. This may be simply achieved because the graphical items 'User note', 'Calendar', 'Audio applications' and 'Shortcut bar' are represented by the identifiers of their corresponding elements. Thus the element that is deleted or inhibited is the one with an identifier "Shortcut bar".

Figure 2D:
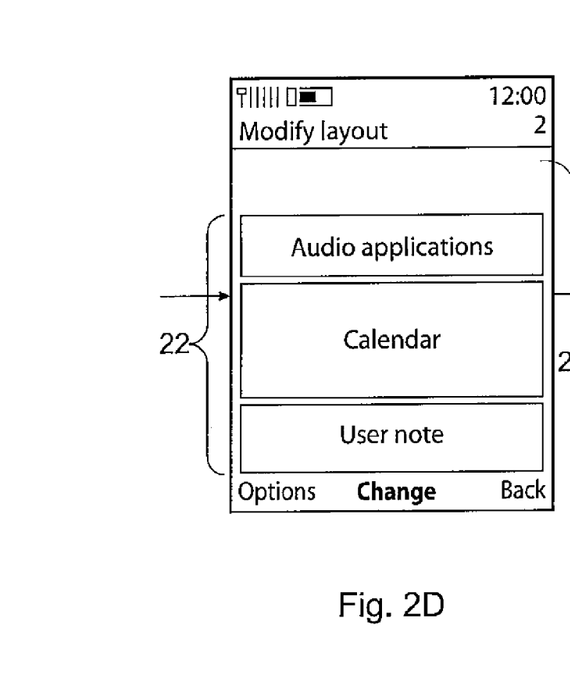

The screen illustrated in FIG. 2D is then presented. This corresponds to the screen previously presented in FIG. 2B except that the standby screen 22 content has been changed and the zone for 'Shortcut bar' is absent leaving a space 28 where a portion of the background can be seen.

Figure 2E:
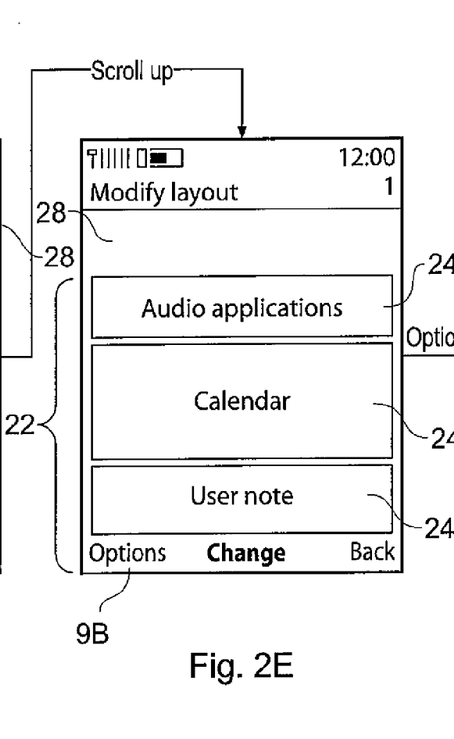
Figure 2F:
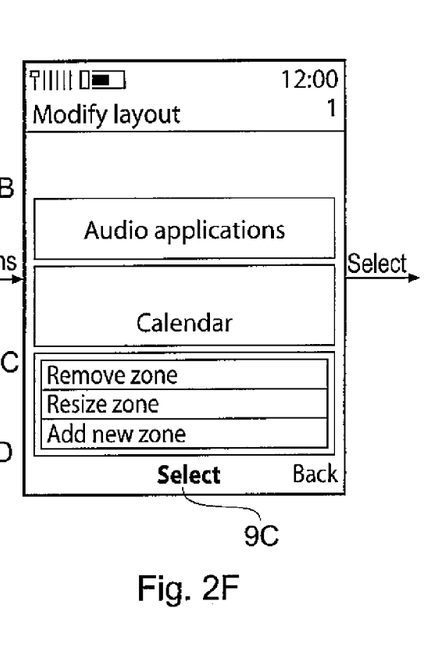

The selector 8E is then used, in this example, to scroll the highlight up/down to select the 'Calendar' graphical item (zone) 24C. The softkey 8B is depressed selecting 'options' 9B while the 'Calendar' graphical item (zone) 24C is highlighted. A new screen is presented as illustrated in FIG. 2F.

Figure 2G:
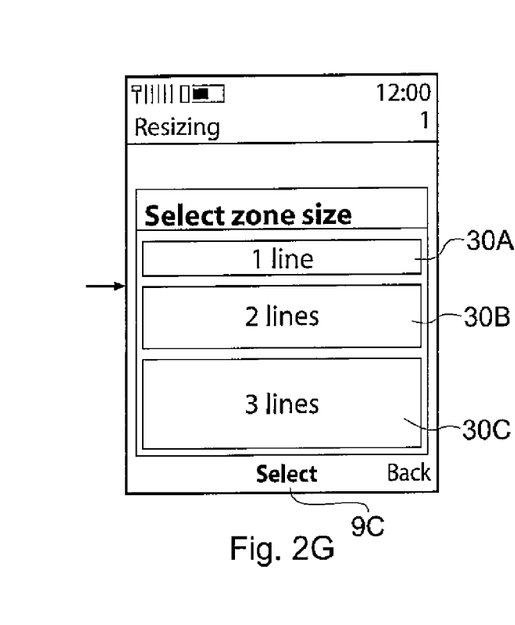
Figure 2H:
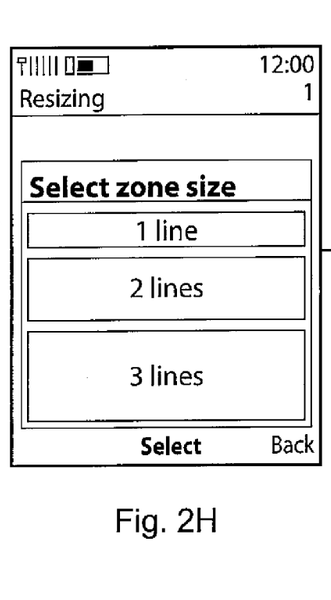

A number of different options 26 are presented including 'Remove zone' 26A, 'Resize zone' 26B and 'add new zone' 26C. Other options may also be presented such as 'move zone'. An appropriate option 26 is selected by highlighting the desired option 26 using selector 9E and then depressing the soft key 8C. In the illustrated example, the 'Resize zone' option is highlighted and then selected. A new screen is then presented as illustrated in FIG. 2G.

A number of different size options 30 are presented including '1 line' option 30A, '2 lines' option 30B and '3 lines' option 30C. These options represent a new height for the zone previously selected i.e. the Calendar graphical item (zone) 24C. An appropriate height option 30 is selected in FIG. 2G by highlighting the desired option 30 using selector 9E and then depressing the soft key 9C. In the illustrated example, the '3 lines' option 30C is highlighted and then selected. The 'Calendar' graphical item 24C is then automatically re-sized in the standby screen 22 or if the re-size is not possible an error alert is given.

The re-sizing is achieved, for example, by amending the element within the standby screen layout file that relates to the graphical item 'Calendar' 24C. The relevant code can be found by parsing the file content to find the element with the identifier "Calendar". This element is then parsed to find to find the second sub-element and the second sub-element is then parsed to find the second attribute. The value of the second attribute of the second sub-element is then automatically updated to reflect the selected height option. If the option '1 line' is selected then the second attribute is set to a value corresponding to one unit. If the option '2 lines' is selected then the second attribute is set to a value corresponding to the two units. If the option '3 lines' is selected then the second attribute is set to a value corresponding to the three units. If the sum of the values for the second attribute of the second sub-element for the elements, in the standby screen layout file, corresponding to the displayed graphical items is greater than the height of the display then an error alert is generated.

Figure 2I:
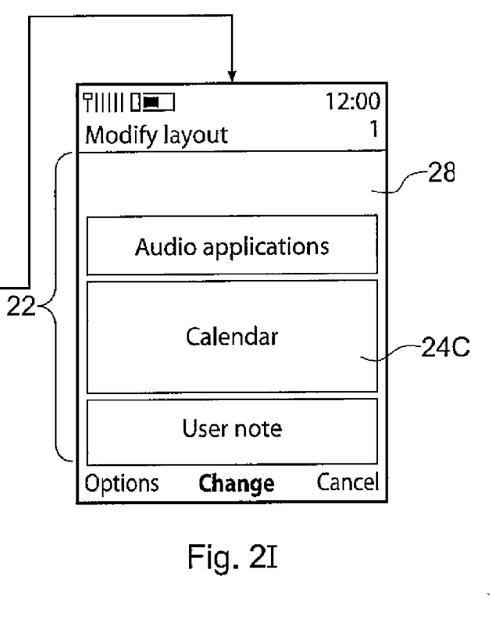

The screen illustrated in FIG. 2I is presented if the resize is successful. This corresponds to the screen previously presented in FIG. 2B except that the standby screen 22 content has been changed and the strip zone for 'Calendar' has been re-sized from 4 to 3 lines.

Although a method for re-sizing the height only of a graphical element (zone) has been described, it is also possible to modify the width of the zone used for a graphical item 24.

Although, in the re-sizing described above the new size of the graphical element (zone) is achieved by selecting predetermined values, in other implementations, the user may enter values for the height and/or width of the newly re-sized zone. A checking mechanism may be used to ensure that an entered value is a valid value.

This may be achieved, for example, by allowing a user to specify the values for the height and width of a zone occupied by a selected graphical item 24 after the 'resize zone' option is selected in FIG. 2F. The value input for height would be used for the second attribute in the second sub-element of the element associated with the selected graphical item and the value input for width would be used for the second attribute of that second sub-element. Alternatively, a user may be able to select a corner of the zone corresponding to a selected graphical item 24 and drag that corner to re-size the graphical item 24. The new size is then translated into values for the first and second attributes of the second sub-element.

In order to add a new graphical item (zone) 24 to the standby screen 22, the position for the new graphical item is selected by highlighting the existing graphical item (zone) 24 next to which the new graphical item (zone) 24 is to be inserted. If the 'Add new zone' option 26C had been selected in FIG. 2C, then the new graphical item would be inserted beneath the 'Shortcut bar' graphical item (zone) selected in FIG. 2B. If the 'Add new zone' option 26C had been selected in FIG. 2F, then the new graphical item would be inserted beneath the 'Calendar' graphical item (zone) 24C. Let us assume that the new graphical item is to be inserted under the 'Calendar' graphical item 24C. At the next screen, the 'add new zone' option 26C is highlighted then selected. The user is then asked to identify the file that defines the content of the new graphical item 24 and to give the new graphical item an identifier e.g. newname. Other configuration options may also be given. For example, the user could select the content of the selected zone in the standby screen by selecting from a predefined list of content options such as world clock, battery status, message status etc.

An element for the new graphical item is automatically inserted immediately after the element for Calendar by automatically updating the standby screen layout file. This is achieved by parsing the standby screen layout file to identify the end of the element having as an identifier 'Calendar' and then inserting the new element after then end of the Calendar element. The new element includes:

```
<element file='new". identifier='newname'>
<label>
    <text>newname</text>
</label>
...
</element>
```

Figure 4A:
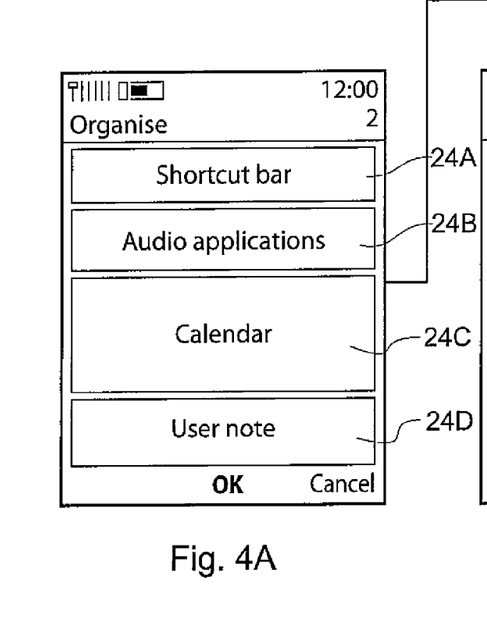
FIGS. 4A to 4E illustrate the user customization of a standby screen of a device 10 using a menu of the device 10.

In order to move an existing graphical item (zone) 24 in the standby screen 22, the graphical item (zone) 24 is highlighted then selected in a step equivalent to that illustrated in FIG. 2B (Shortcut bar 24A to be moved) or 2E (Calendar 24C to be moved). Let us assume that the 'Audio applications' graphical item is to be moved and is highlighted. Then 'Options' 9B is selected and a 'move zone' option 26 (not shown) is selected at the next screen. The screen illustrated in FIG. 4A is then presented.

Figure 4B:
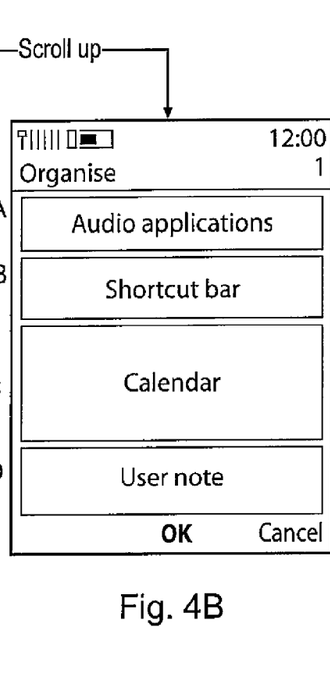
Figure 4C:
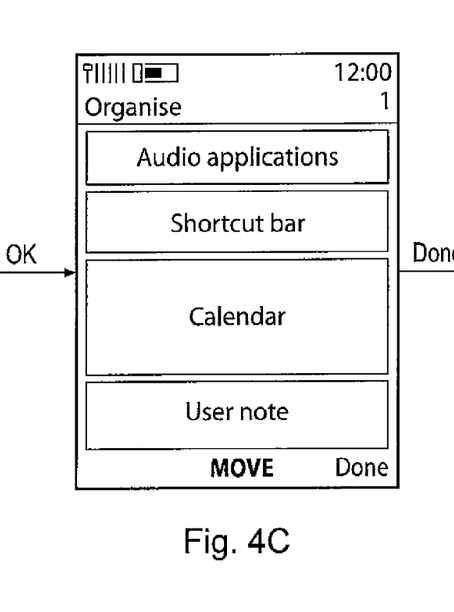

It is as if the selected graphical item (zone) 24B has been grabbed and it is then moved within the standby screen 22 using the selector 9E. For example, as illustrated in FIG. 4B, scrolling-up once moves the 'audio applications' graphical item 24B above the 'Shortcut bar' graphical item 24A. If the user is satisfied with the placement of the selected graphical item 24B, the user selects the softkey 8C 'OK' to select that position. Selecting OK is equivalent to releasing the grabbing of the selected zone. The selected layout is then presented as illustrated in FIG. 4C.

Figure 4D:
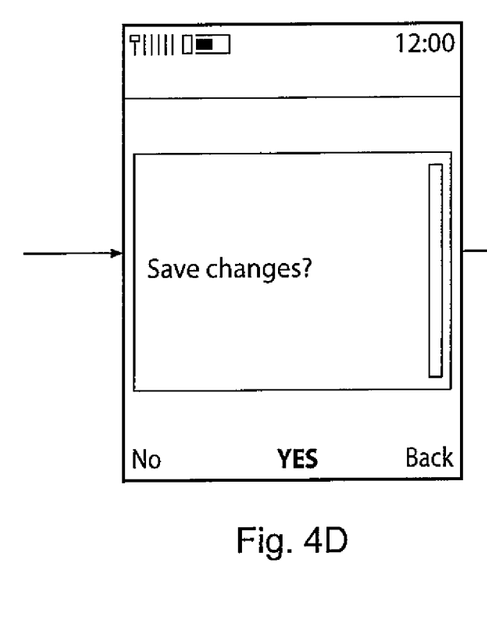
Figure 4E:
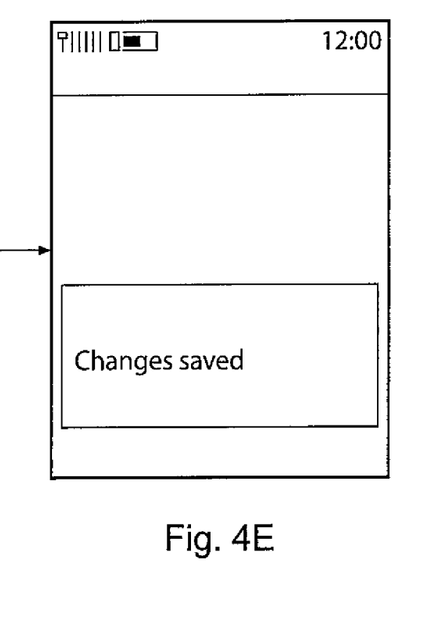

The user then selects the softkey 8D 'Done' and then in the following screen (FIG. 4D) the softkey 8C 'YES' to save the changes. A screen (FIG. 4E) indicating that the changes have been saved is momentarily presented before the display returns to a screen equivalent to that displayed in FIG. 2A.

The order of the graphical items 24 in the standby screen 22 is changed by changing the order of the elements in the standby screen layout file. The element associated with the graphical item selected in FIG. 4A is 'cut' and then moved up or down the standby screen layout file, element by element, in response to scrolling. In FIG. 4B, it has been moved up one element so that it precedes the 'Shortcut bar' element in the standby screen layout file.

It may also be possible to change the location of a graphical item e.g. 'Audio applications', for example, by amending code in the element within the standby screen layout file that relates to that graphical item. The relevant code can be found by finding the element with the identifier "Audio applications". This element is then parsed to find the first sub-element. The first sub-element is then parsed to find the first and second attributes. The values of the first and second attributes are automatically updated to reflect a new position for the graphical item. The particular values of the first and second attributes may, for example, be entered by a user using the user input device 8.

The standby screen layout file may be stored on a removable memory, so that the user can move the settings for the standby screen to a new device. In this way, even though the user buys a new device, he can have the same standby screen.

Although embodiments of the present invention have been described in the preceding paragraphs with reference to various examples, it should be appreciated that modifications to the examples given can be made without departing from the scope of the invention as claimed. Particular commands from the user interface are used to automatically generate amendments to the code defining the standby screen. The precise nature of the amendments generated for each different one of the particular user interface commands depends upon how the standby screen is defined by code, which will typically vary from platform to platform.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

The invention claimed is:
1. Apparatus, comprising:
at least one processor; and
memory including computer program instructions configured to, working with the at least one processor, control the apparatus at least to:
access at least one standby screen layout file which defines a plurality of elements, each element relating to an individually resizable graphical item displayed in a standby screen, wherein each element has a plurality of attributes relating to at least the position and size at which a related graphical item is displayed in a standby screen which is shown when a used application exits until another application or the same application is started;
cause display of the standby screen, which comprises the plurality of related graphical items having the sizes and positions defined by their related elements in the at least one standby screen layout file;
respond to at least a first user input by causing the electronic device to enter a standby screen customization mode in which a plurality of zones representing said graphical items are displayed in a representation of said standby screen, wherein each graphical item of the standby screen is provided in a zone displayed in said representation of the standby screen, wherein a standby screen customization mode enables each zone to be individually selected for resizing in said representation of the standby screen, and resizing a zone in said representation of said standby screen changes at least the size attribute of the element related to the graphical item represented by said zone defined in the at least one standby screen layout file;
respond to at least a second user input, provided subsequent to the at least a first user input and provided while the electronic device is in the standby screen customization mode, which modifies the size of an individual zone in said representation of said standby screen by amending and automatically updating at least the size attributes of the element related to the graphical item represented by said zone in said at least one standby screen layout file;
cause display, in response to modifying the size of a said zone, of a representation of said standby screen including the zone with said modified size when said electronic device remains in said standby screen customization mode;
cause the at least one standby screen layout file having the amended and automatically updated size attributes to be saved; and
cause display of the graphical item related to the element represented by said zone with the modified size when said electronic device exits said standby screen customization mode, and returns to displaying the standby screen.

2. The apparatus of claim 1, wherein amending and automatically updating the size attributes of the element related to the graphical item comprises adjusting at least one of height of the graphical item and width of the graphical item.

3. The apparatus of claim 1, wherein the modified size is one of a plurality of predetermined re-sizing options.

4. The apparatus of claim 1, wherein the computer program instructions are configured to, working with the at least one processor, control the apparatus to further enable a user to move the graphical item when the electronic device is in the standby screen customization mode.

5. The apparatus of claim 1, wherein the standby screen is displayed on a touch screen display, and at least the second user input is provided at the touch screen display.

6. The apparatus of claim 1, wherein the standby screen is the root of a menu system.

7. The apparatus as claimed in claim 1, wherein the computer program instructions are configured to, working with the at least one processor, control the apparatus to: respond to at least a third user input, provided subsequent to the at least a second user input and provided while the electronic device is in the standby screen customization mode, which further modifies the size of the individual zone in said representation of said standby screen by further amending and automatically updating at least the size attributes of the element related to the graphical item represented by said zone in said at least one standby screen layout file; cause the at least one standby screen layout file having the further amended and automatically updated size attributes to be saved; and cause display of the graphical item related to the element represented by said zone with the further modified size when said electronic device exits said standby screen customization mode and returns to displaying the standby screen.

8. The apparatus of claim 1, wherein the apparatus is the electronic device.

9. The apparatus of claim 1, wherein the computer program instructions are configured to, working with the at least one processor, control the apparatus to: determine whether to cause an error alert to be provided, based on the amended and automatically updated size attributes, indicating that modification of the size of said zone is not possible.

10. A method, comprising:
  accessing at least one standby screen layout file which defines a plurality of elements, each element relating to an individually resizable graphical item displayed in a standby screen, wherein each element has a plurality of attributes relating to at least the position and size at which a related graphical item is displayed in a standby screen which is shown when a used application exits until another application or the same application is started;
  causing display of the standby screen, which comprises the plurality of graphical items having the sizes and positions defined by their related elements in the at least one standby screen layout file;
  responding to at least a first user input by causing the electronic device to enter a standby screen customization mode in which a plurality of zones representing said graphical items are displayed in a representation of said standby screen, wherein each graphical item of the standby screen is provided in a zone displayed in said representation of the standby screen, wherein a standby screen customization mode enables each zone to be individually selected for resizing in said representation of the standby screen, and resizing a zone in said representation of said standby screen changes at least the size attribute of the element related to the graphical item represented by said zone;
  responding to at least a second user input, provided subsequent to the at least a first user input and provided while the electronic device is in the standby screen customization mode, which modifies the size of an individual zone in said representation of said standby screen by amending and automatically updating at least the size attributes of the element related to the graphical item represented by said zone in said at least one standby screen layout file;
  causing the at least one standby screen layout file having the amended and automatically updated size attributes to be saved; and
  causing display of the graphical item related to the element represented by said zone with the modified size when said electronic device exits said standby screen customization mode, and returns to displaying the standby screen.

11. The method of claim 10, wherein amending and automatically updating the size attributes of the element related to the graphical item comprises adjusting at least one of height of the graphical item and width of the graphical item.

12. The method of claim 11, wherein adjusting at least one of height of the graphical item and width of the graphical item comprises entering one or more values for the height and width of the newly resized zone and checking to ensure that the entered value is a valid value.

13. The method of claim 10, wherein the modified size is one of a plurality of predetermined re-sizing options.

14. The method of claim 10, further comprising: enabling a user to move the graphical item when the electronic device is in the standby screen customization mode.

15. The method of claim 10, wherein the standby screen is displayed on a touch screen display, and at least the second user input is provided at the touch screen display.

16. A non-transitory computer readable medium storing computer program instructions configured, working with at least one processor, to cause at least the method of claim 10 to be performed.

17. The method as claimed in claim 10, further comprising: responding to at least a third user input, provided subsequent to the at least a second user input and provided while the electronic device is in the standby screen customization mode, which further modifies the size of the individual zone in said representation of said standby screen by further amending and automatically updating at least the size attributes of the element related to the graphical item represented by said zone in said at least one standby screen layout file; cause the at least one standby screen layout file having the further amended and automatically updated size attributes to be saved; and cause display of the graphical item related to the element represented by said zone with the further modified size when said electronic device exits said standby screen customization mode and returns to displaying the standby screen.

18. The method of claim 10, further comprising: determining whether to cause an error alert to be provided, based on the amended and automatically updated size attributes, indicating that modification of the size of said zone is not possible.

19. Apparatus, comprising:
  at least one processor; and
  memory including computer program instructions configured to, working with the at least one processor, control the apparatus at least to:
  access at least one standby screen layout file which defines a plurality of elements, each element relating to an individually resizable graphical item displayed in a standby screen, wherein each element has a plurality of attributes relating to at least the position and size at which a related graphical item is displayed in a standby screen which is shown when a used application exits until another application or the same application is started;
  cause display of a standby screen, which comprises the plurality of graphical items having the sizes and positions defined by their related elements in the at least one standby screen layout file;
  responding to user input by causing the electronic device to enter a standby screen customization mode in which a plurality of zones representing said graphical items are displayed in a representation of said standby screen, wherein each graphical item of the standby screen is provided in a zone displayed in said representation of the standby screen, wherein a standby screen customization mode enables each zone to be resized one zone at a time in said representation of the standby screen, and resizing a zone in said representation of said standby screen changes at least the size attribute of the element related to the graphical item represented by said zone; and
  respond to at least a second user input, which is for modifying the size of an individual zone in said representation of said standby screen and which is provided subsequent to the at least a first user input while the electronic device is in the standby screen customization mode, by determining that resizing of the individual zone is not possible and by causing an error alert to be provided to the user indicating that the resizing of the individual zone is not possible.

20. The apparatus of claim 19, wherein the apparatus is the electronic device.

* * * * *